United States Patent [19]

Bicknell

[11] Patent Number: 4,733,142
[45] Date of Patent: Mar. 22, 1988

[54] WINDSCREEN WIPER CONTROL

[75] Inventor: John Bicknell, Rudgwick, England

[73] Assignee: Cogent Limited, London, England

[21] Appl. No.: 930,291

[22] PCT Filed: Feb. 5, 1986

[86] PCT No.: PCT/GB86/00062
§ 371 Date: Oct. 3, 1986
§ 102(e) Date: Oct. 3, 1986

[87] PCT Pub. No.: WO86/04554
PCT Pub. Date: Aug. 14, 1986

[30] Foreign Application Priority Data
Feb. 5, 1985 [GB] United Kingdom ............... 8502872

[51] Int. Cl.$^4$ ............................................. B60S 1/08
[52] U.S. Cl. ................................ 318/283; 15/250 C
[58] Field of Search ............... 318/DIG. 2, 283, 285, 318/443, 444, 445, 449, 452, 483, 484, 487; 15/250 C, 250.12, 250.13

[56] References Cited
U.S. PATENT DOCUMENTS

| 3,458,889 | 8/1969 | Tann | 15/250 B X |
|---|---|---|---|
| 3,643,145 | 2/1972 | Tann et al. | 318/443 |
| 4,499,410 | 2/1985 | Iacoponi et al. | 318/444 |
| 4,625,157 | 11/1986 | Phillimore | 318/DIG. 2 X |

FOREIGN PATENT DOCUMENTS

| 2518471 | 6/1983 | France | |
|---|---|---|---|
| 58-112856 | 7/1983 | Japan | 318/443 |

Primary Examiner—Bentsu Ro
Attorney, Agent, or Firm—Bacon & Thomas

[57] ABSTRACT

Control apparatus for controlling a windscreen wiper in accordance with the mean moisture level on the windscreen includes a microprocessor 9 arranged to detect via input 22 the time a wiper motor 1 takes to sweep the windscreen. The microprocessor calculates an appropriate delay in dependence on the detected sweep time and then causes a subsequent sweep via transistor 4. The delay is varied automatically by the microprocessor so as to rapidly clear the windscreen and then stop the wiper.

9 Claims, 2 Drawing Figures

WINDSCREEN WIPER CONTROL

BACKGROUND OF THE INVENTION

1. Field of the Invention

This invention relates to a method and apparatus for controlling a windscreen wiper, for example for a motor vehicle.

2. Description of Related Art

The self-evident objective of a windscreen wiper system is to maximise the driver's visibility of the road ahead. Whilst under conditions of heavy rainfall this objective is likely to demand the highest possible sweep rate, under light rainfall conditions the sweep rate must be reduced to avoid smearing, blade judder and excessive wear in the system. Known methods for adjusting the sweep rate are variation of the sweep time (a multiple speed wiper motor) and variation of the delay between consecutive sweep cycles. Known systems incorporate switched motor speeds, switched delays and variable delays, all of which are controlled manually by the driver. Manual adjustment of sweep rate is a source of distraction to the driver, particularly in heavy traffic.

It is also known to employ optical or electrical sensing means for the detection of moisture on a windscreen for the purpose of activating windscreen wipers. However, such devices have not provided an economical and effective means of controlling windscreen wipers to optimise visibility and manual intervention by the driver has still been required. It is an object of the invention to provide a method and apparatus for controlling a windscreen wiper which is effective automatically to adjust the rate of operation of the wiper in dependence on the mean moisture level on the windscreen.

SUMMARY OF THE INVENTION

According to the invention there is provided a method of controlling a windscreen wiper comprising adjusting the delay between sweeps of the wiper in dependence on the time the wiper takes to sweep the screen. Preferably each single sweep is timed and the delay between successive sweeps is adjusted. However, it would be possible to time bursts of two or more sweeps of the wiper and adjust the delay between the bursts.

The invention is based on the recognition that the sweep time of a windscreen wiper depends on the wetness of the screen. Dry conditions demand a higher torque from the wiper motor than wet conditions and an electric or other motor which is limited in torque operates at a slightly lower speed under dry conditions than under wet conditions, the speed increasing monotonically between the two extremes. The speed and variation of speed with wetness have been found to be substantially independent of aerodynamic conditions. Thus by adjusting the delay between sweeps of the wiper in dependence on the sweep time the overall sweep rate of the wipers varies according to the wetness of the screen.

Preferably the sweep time is determined by monitoring operation of a limit switch of the wiper motor, for example a self-park switch which is closed after the start of each sweep cycle (the motion of the wiper from the parked position to the maximum point of travel and back to the parked position) and opened at the end of the sweep cycle. For example, the period between the time the motor starts and the time the limit switch operates at the end of a sweep cycle may be determined.

Various methods could be employed for determining the delay in terms of the sweep time. Preferably estimated maximum and minimum sweep time values are established, and the delay is determined by the relation of the measured sweep time to the maximum and minimum values. The delay could be determined from the sweep time by an open loop method in accordance with a function established by an analogue function generating circuit or digitally by means of a look-up table or algorithmic method, i. e. a scale of delay times is established for values of the measured sweep time between the maximum and minimum values. Alternatively, a closed loop technique could be used in which a desired sweep time is established (corresponding of course to a desired screen wetness) and the delay time is established in accordance with the difference between the measured sweep time and the desired sweep time. Preferably the established values of the maximum and minimum sweep times are automatically updated during operation. These values will of course vary with varying battery voltage and slowly with mechanical wear. They will also have different values for each individual vehicle. The estimated or expected maximum and minimum values can be altered in dependence on the battery voltage by a scheduled computation, i.e. the relation is first determined empirically and then applied in real time. Parameter estimation techniques can be used to reflect changes due to wear. For example, if a sweep time below the expected minimum is encountered for a particular range of battery voltage the expected minimum value is altered to the new minimum found in practice. In one scheme of operation the estimated minimum sweep time is established on the basis of a first measured sweep time, the estimated maximum sweep time is established at a value higher than the minimum value by a predetermined amount, and the minimum value is automatically updated on the basis of the newly measured value when a sweep time is measured which is below the current estimated minimum value. These methods enable a windscreen wiper controller to automatically accomodate variations in battery voltage and mechanical wear and even major changes in the components, such as the replacement of the wiper motor or the wiper blades.

In addition to controlling the delay between sweeps of the wiper, it would be possible to switch the wiper motor to a different speed under certain conditions. For example, if a particularly low value of the sweep time indicative of heavy rainfall is detected, the wiper motor could be switched to a higher speed.

In a practical system it is necessary to provide controls whereby the driver can at least override the system by switching to continuous operation or by switching the wipers off. In a further development of the invention the sweep time/delay profile (in an open loop system) or the demanded wetness (in a closed loop system) could be modified in accordance with the frequency of these actions by the driver. The modification would be in a direction to reduce the occurrence of the actions: for example, if the driver often overrides the system by switching to continuous operation the demanded wetness could be set lower.

Preferably the wiper control method is initiated by the driver but alternatively an electrical or optical moisture detector could be employed to initiate the control whereby no driver action at all would be required.

Viewed from another aspect, the invention provides a windscreen wiper comprising a motor for sweeping a windscreen wiper blade across a windscreen and electronic control apparatus arranged to control the operation of the motor so as to provide a delay between sweeps of the wiper blade, which delay varies in dependence on the time the wiper blade takes to sweep the screen. Preferably the control apparatus has an input electrically coupled to the motor so as to receive a signal when the motor is running. The wiper may include a limit switch arranged to be actuated at the end of a sweep and the control apparatus may be connected to the limit switch and arranged to end the timing of the sweep on actuation of the limit switch. The limit switch may be a self-park switch arranged to stop the motor at the end of its sweep. Preferably the control apparatus includes a microprocessor arranged to determine the time the wiper blade takes to sweep the screen, to calculate a delay between successive sweeps of the wiper blade and to control the motor accordingly.

Such apparatus may provide a windscreen wiper which is able automatically to adapt to a wide variety of conditions and to keep the windscreen cleared without intervention of the driver, whilst the apparatus may be economical to construct, at least compared to the provision of multi-speed motors, adjustable delay units and the like.

BRIEF DESCRIPTION OF THE DRAWINGS

An embodiment of the invention will now be described by way of example and with reference to the accompanying drawings in which.

DESCRIPTION OF PREFERRED EMBODIMENTS

Figure 1:
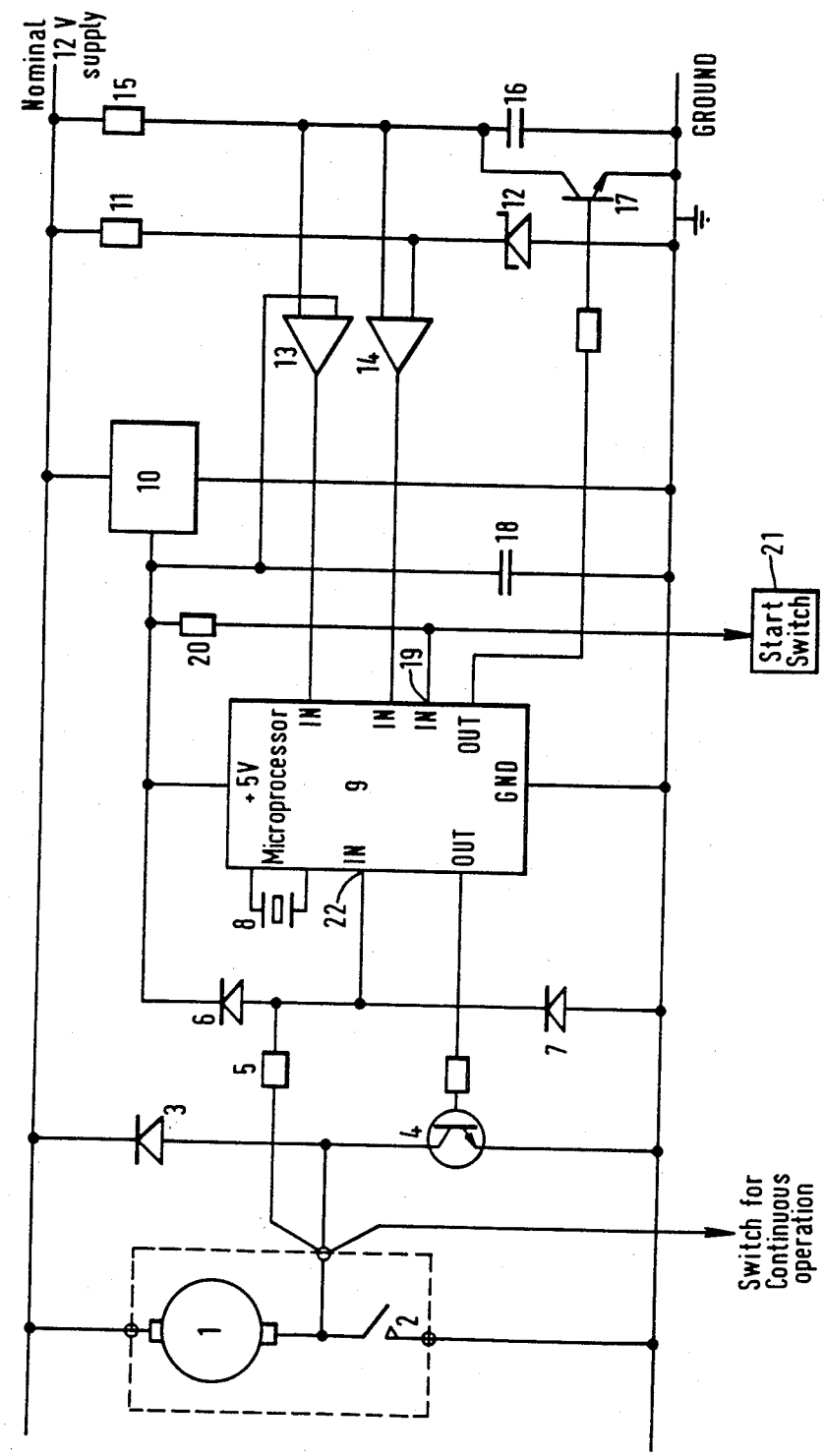
FIG. 1 is an electrical circuit diagram of a windscreen wiper according to the invention.

Referring to FIG. 1, a vehicle windscreen wiper includes a wiper motor 1 and an associated self-park switch 2 which is closed during the sweep of the wiper blade but opens at the parked position at one extreme of the sweep. An electronic control circuit for controlling the operation of the motor 1 comprises a microprocessor 9 which is provided with a conventional crystal 8. An integrated circuit voltage regulator 10 and capacitor 18 provide a regulated 5 volts supply for the microprocessor 9, which supply also defines a logical high level for some of the microprocessor inputs. Specifically, microprocessor input 19 is supplied with a logical high level via resistor 20 until a spring-loaded push-to-start switch 21 is actuated. Initiation of the microprocessor program in this manner causes the output of a pulse to transistor 4 which is thereby rendered conductive causing the motor 1 to begin its operation. The pulse provided by the microprocessor is of sufficient length, e.g. 100 ms, to maintain the motion of the motor until the switch 2 closes to latch the motor in operation. If desired, the transistor 4 could be arranged to drive a relay having contacts connected in parallel with switch 2.

Input terminal 22 of microprocessor 9 receives a signal from the self-park switch 2 which is at a low level while the motor is running but reverts to the high level in the parked position of the motor. The microprocessor calculates the time of the sweep of the wiper and thence calculates an appropriate delay before a second pulse is applied to transistor 4. Diodes 3, 6 and 7 are protection diodes. At some point during each sweep of the wiper the microprocessor outputs a brief pulse to transistor 17 which discharges capacitor 16. The capacitor 16 then begins to charge from the battery supply via resistor 15 and comparators 13 and 14 provide respective inputs to the microprocessor when two different voltage levels on the capacitor 16 are reached. Comparator 13 provides an input when the voltage of capacitor 16 reaches 5 volts and comparator 14 provides an input when the voltage reaches a higher level determined by zener diode 12 which is supplied by resistor 11. The times taken to reach these two voltages are determined by the microprocessor and thence the battery supply voltage is calculated.

Figure 2:
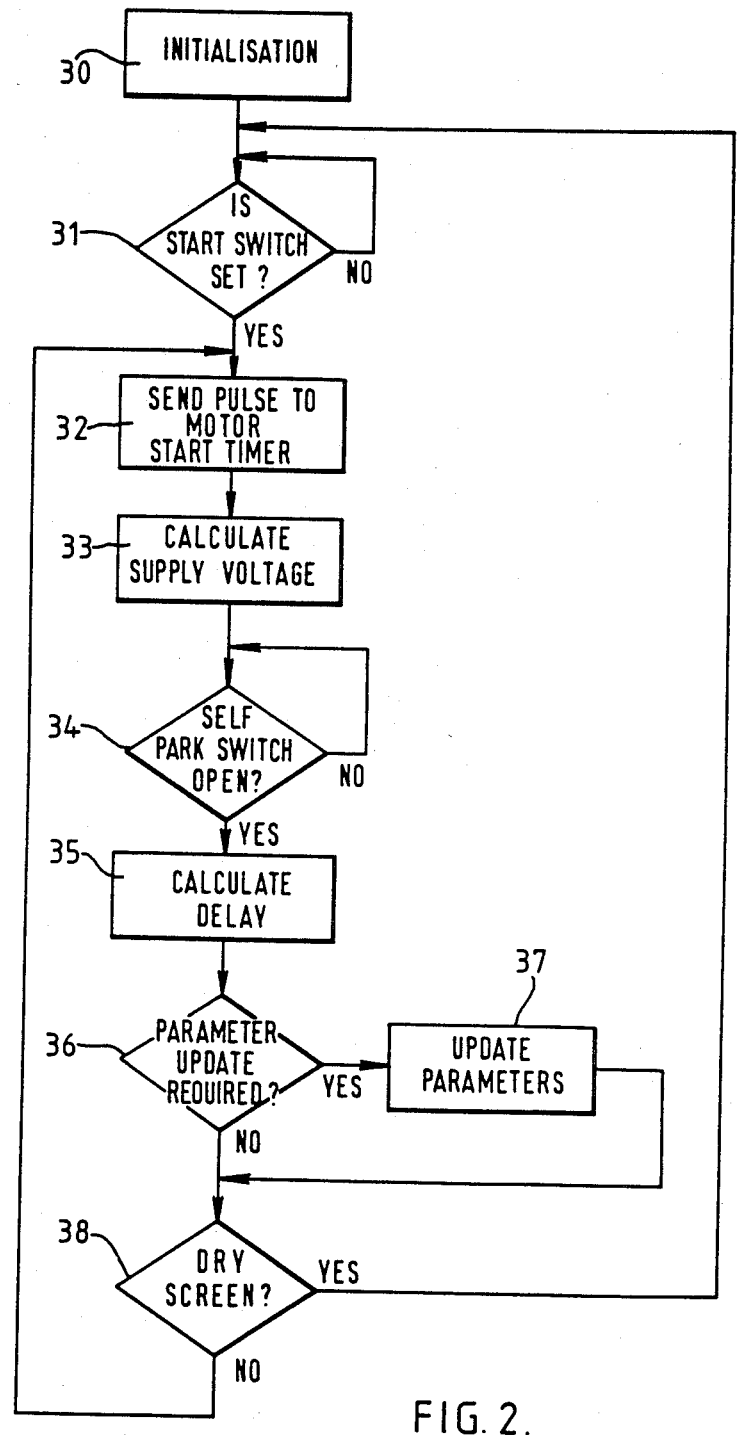
FIG. 2 is a flow chart of the routine executed by the microprocessor of the circuit of FIG. 1.

Referring now to FIG. 2, a flow chart of the software in microprocessor 9 is shown. Firstly, in step 30, various registers are initialized. The program remains in a loop around decision step 31 until the start switch 21 is actuated. When the start switch is actuated the microprocessor sends a pulse to transistor 4 to start the motor and simultaneously a timer or timing routine is started in step 32. During the operation of the motor 1 a pulse is output to transistor 17 and the battery supply voltage is calculated in step 33 as outlined above. The program then remains in a loop around decision step 34 until the end of the sweep of the wiper when the self park switch 2 opens again. At this point the timer is read to determine the sweep time and the corresponding required delay is calculated in step 35.

The delay calculation may use an open-loop or closed loop method. The open loop control method assumes a fixed sweep time/delay profile and incorporates this profile between the maximum and minimum sweep times. The next delay, $T_D$ for a previous sweep time $T_S$ is given by $$T_D = F\left(\frac{T_S - T_{SMIN}}{T_{SMAX} - T_{SMIN}}\right),$$

where $T_{SMAX}$ and $T_{SMIN}$ are expected maximum and minimum sweep times established in the microprocessor. The profile F is chosen empirically to give satisfactory results, and may provide delay values in the range 0 to 3 s, for example.

The closed loop method uses a single parameter, demanded wetness, which is held as the equivalent desired sweep time $T_{SD}$. The delay time is calculated from the 'error' between the sweep time $T_S$ and the desired sweep time, i.e. as $$T_D = K\left(\frac{T_S - T_{SD}}{T_{SMAX} - T_{SMIN}}\right)$$

where K is a suitable gain factor.

The calculated delay is applied by the microprocessor such that a following pulse is not issued to the motor until the end of the calculated delay. The program next proceeds to a decision step 36 at which it is determined if an update of the parameters $T_{SMAX}$ or $T_{SMIN}$ is required. A variety of tests could be employed for this requirement. For example, a test could be performed to see if the sweep time $T_S$ is less than the current minimum $T_{SMIN}$ or greater than $T_{SMAX}$. If so the parameter $T_{SMIN}$ or $T_{SMAX}$, as the case may be, is updated in step 37 to the current sweep time $T_S$.

The calculated battery supply voltage could be applied to scale the values of $T_{SMIN}$ and $T_{SMAX}$ but in a simpler procedure the sweep time is ignored, i.e. not applied to update these values, if the battery voltage is outside of a predetermined range.

Alternatively, an adaptive updating technique could be employed which does not require measurement of battery voltage and so step 33 and components 11–17 could be omitted. As an example of this technique, an estimated minimum sweep time $T_{SMIN}$ could initially be determined on the basis of the first measured sweep time, preferably equal to the first measured sweep time, and the estimated maximum sweep time set at the minimum plus a predetermined amount. The expected minimum could then be updated to a newly measured value when one or more newly measured time values occur which are lower than the currently stored expected minimum value. On updating the expected minimum value the expected maximum value could be updated by adding the predetermined amount. The predetermined amount could be a fixed amount, e.g. 70 ms, or could be variable to some extent in dependence on the width of the range of values of sweep time encountered in a session of operation.

The above updating techniques allow the system automatically to adapt to mechanical wear, etc.

A test is then performed in step 38 for a dry screen, e.g. if the sweep time has remained at its maximum value. If not, the program returns to step 32 to cause another sweep. If a dry screen is detected the program returns to step 31 to await another start signal from the driver-operated switch 21. The screen could be considered dry and operation halted if a sweep time above the expected maximum is encountered on two successive sweeps. After operation is halted there could be a relatively long delay, e.g. 12 s, and a further sweep of the screen, which would serve to remove any residual moisture and confirm that dry conditions prevail. Wiping would automatically restart if the sweep time of the final sweep is not indicative of the desired dryness.

I claim:

1. A method of controlling a windscreen wiper in which each single sweep of the wiper is timed and the delay between successive sweeps is adjusted in dependence on the time of the previous sweep of the wiper, characterized by establishing an estimated minimum sweep time value on the basis of a first measured sweep time, effectively establishing an estimated maximum sweep time value at a value higher than the estimated minimum sweep time value by a predetermined amount, automatically updating the estimated minimum sweep time value on the basis of a newly measured balue when a sweep time is measured which is below the current estimated minimum sweep time value, and determining the delay between successive sweeps from the relation of the measured previous sweep time to the estimated minimum and maximum sweep time values.

2. A method as claimed in claim 1 wherein a scale of delay times is established for values of the measured sweep time between the estimated maximum and minimum sweep time values.

3. A method as claimed in claim 1 wherein a desired sweep time is established in dependence on the estimated maximum and minimum sweep time values and the delay time is determined in accordance with the difference between the measured sweep time and the desired sweep time.

4. A method as claimed in claim 1 wherein the wiper includes an electric motor powered by an electric source, comprising detecting the voltage of said source and modifying said estimated maximum and minimum sweep time values in accordance with the detected voltage.

5. A method as claimed in claim 1 wherein the relation used in determining the delay is based on a monotonic increase of sweep speed with increasing screen wetness.

6. A method as claimed in claim 1 wherein the sweep time is determined by monitoring operation of a limit switch of the wiper.

7. A method as claimed in claim 6 wherein the sweep time is determined by timing the period between the time a motor of the wiper starts and the time said limit switch operates at the end of a sweep cycle.

8. A method as claimed in claim 7 wherein said limit switch is a self-park switch of the wiper motor.

9. A windscreen wiper comprising a motor for sweeping a windscreen wiper blade across a windscreen and electronic control apparatus arranged to control the operation of the motor so as to provide a delay between sweeps of the wiper blade, which delay varies in dependence on the time the wiper blade takes to sweep the screen, the control apparatus including means to determine the time the wiper blade takes to sweep the screen, means to calculate a delay between sucessive sweeps of the wiper blade and means to control the motor according, characterized in that the control apparatus includes a microprocessor having means to establish an estimated minimum sweep time value on the basis of a first measured sweep time, means to effectively establish an estimated maximum sweep time value at a value higher than the estimated minimum sweep time value by a predetermined amount, means to automatically update the estimated minimum sweep time value on the basis of the newly measured value when a sweep time is measured which is below the current estimated minumum sweep time value, and means to determine the delay between successive sweeps from the relation of the measured previous sweep time to the estimated minimum and maximum sweep time values.

* * * * *